United States Patent
Lopez et al.

(10) Patent No.: US 8,172,717 B2
(45) Date of Patent: May 8, 2012

(54) COMPLIANT CARRIER WALL FOR IMPROVED GEARBOX LOAD SHARING

(75) Inventors: Fulton Jose Lopez, Clifton Park, NY (US); Daniel Jason Erno, Clifton Park, NY (US); Darren Lee Hallman, Scotia, NY (US); Bugra Han Ertas, Albany, NY (US); Robert Michael Zirin, Niskayuna, NY (US); Michael John Wittbrodt, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 13/155,440

(22) Filed: Jun. 8, 2011

(65) Prior Publication Data
US 2012/0028756 A1    Feb. 2, 2012

(51) Int. Cl.
*F16H 57/08*    (2006.01)
(52) U.S. Cl. ....................................... 475/346
(58) Field of Classification Search .................. 475/346, 475/347
See application file for complete search history.

(56) References Cited

U.S. PATENT DOCUMENTS

| | | | |
|---|---|---|---|
| 5,098,359 A | 3/1992 | Chales et al. | |
| 5,558,593 A | 9/1996 | Roder et al. | |
| 5,679,089 A | 10/1997 | Leverdahl | |
| 5,928,105 A * | 7/1999 | Taha et al. | 475/331 |
| 2003/0008748 A1* | 1/2003 | Fox | 475/346 |
| 2003/0073537 A1 | 4/2003 | Lloyd | |
| 2003/0162630 A1* | 8/2003 | Poulin et al. | 475/331 |
| 2010/0007150 A1* | 1/2010 | Ciszak et al. | 290/55 |
| 2010/0197445 A1 | 8/2010 | Montestruc | |
| 2010/0303626 A1 | 12/2010 | Mostafi | |

* cited by examiner

*Primary Examiner* — Edwin A Young
(74) *Attorney, Agent, or Firm* — Ann M. Agosti

(57) ABSTRACT

A planetary gear system and a method of fabricating same. The planetary gear system includes at least one planet gear, at least one planet pin receiving the at least one planet gear, and a carrier. The carrier itself includes at least one carrier opening for accommodating the at least planet gear, at least one planet pin opening for receiving the at least one planet pin, and at least one flex portion within a wall of the carrier for providing enhanced compliance to the carrier in response to force directed on the at least one planet gear.

18 Claims, 7 Drawing Sheets

COMPLIANT CARRIER WALL FOR IMPROVED GEARBOX LOAD SHARING

FIELD

The invention relates to a gear system, and more particularly, to a gear system with planet pins, for anchoring planet gears, which centralize the load on each of the planet gears and balance the load between the planet gears.

BACKGROUND

Planetary gear systems are known. Examples of planetary gear systems may be found in U.S. Pat. Nos. 6,994,651 and 7,297,086 and U.S. Patents Pubs. 2011/0039654 and 2011/0053730.

One such system, an epicyclic gear system 10, is shown in cross-section in FIG. 14 to include a planet pin 12 about which a sleeve 22 is disposed. A planet gear 26 encompasses the sleeve 22 and is connected thereto through a rib ring 30. The planet pin 12 includes a groove 14 at a central location thereof. The sleeve 22 includes a tapered landing 24. The planet gear 26 has an indent 28. Rollers 32 are positioned between races found on an inner surface of the planet gear 26 and races found on an outer surface of the sleeve 22.

The planet pin 12 is press fit to an upwind carrier plate (not shown). The gear system 10 acts as a double joint system that allows the planet gear 26 to align to a ring gear and a sun gear (not shown) despite the tangential location and misalignment of planet pin 12. There is a gap 24 between the sleeve 22 and the planet pin 12 to allow relative motion and adjustment of the planet pin 12 for rotational and tangential dislocation due to forces being exerted on the planet gear 26.

Planetary gear systems, such as system 10, find use in applications such as wind turbines. Other potential applications can be found in mill operations, the oil and gas industry, and the aviation industry.

For known planetary gear systems utilizing multiple planet gears, a problem that has developed is the creation of an unbalanced load between the planet gears. As a rotating member—depending upon the gear system, the ring gear, the carrier, or the sun gear may supply an input to the gearbox—rotates, it places a force, or a load, on the planet gears. The load factor $K_\gamma$ of a planetary gear system may be defined as:

$$K_\gamma = T_{Branch} N_{CP} / T_{Nom}$$

Where $T_{Branch}$ is the torque for the gear with the heaviest load, $N_{CP}$ is the number of planets, and $T_{Nom}$ is the total nominal torque for the system. Ideally, the force should be the same on each planet gear, i.e., $K_\gamma = 1.0$, thereby creating a balanced load. However, for a variety of reasons planetary gear systems often suffer from unbalanced loads.

One reason is that the gear teeth of the planetary gears are manufactured with a normal variance for such teeth. For example, the thickness of the gear teeth may vary to an extent expected of tolerances for gear teeth. Additionally, the pitch—the distance between adjacent gear teeth—also may vary.

Under normal manufacturing practices, the planet pin holes in the carrier will be drilled away from their centric true positions. This is due to manufacturing tolerance limitations, complexity of the machined part, measuring capability, and human error. This scenario causes (1) planet pins to be out of alignment from the central shaft, and (2) each planet gear to carry a load different from what they are designed for. Under normal loading conditions, the carrier may twist slightly. This twist may contribute to the misalignment between the planet gears and the ring gear/sun gear assembly. Depending on the number of planets and their respective tolerances, loads experienced by any single planet can increase dramatically, as much as 2× or more.

Reducing the load factor $K_\gamma$ on a gear system will allow smaller system components to be utilized or allow greater loads on system components than are currently placed. A more evenly distributed shared load may allow for an increase in the gearbox torque density.

With some of these concerns in mind, a planetary gear system that includes planetary gears that self-align as they mesh with a ring and a centralized sun gear would be welcome in the art.

SUMMARY

An embodiment of the invention includes a planetary gear system that includes at least one planet gear, at least one planet pin receiving the at least one planet gear, and a carrier. The carrier includes at least one carrier opening for accommodating the at least planet gear, at least one planet pin opening for receiving the at least one planet pin, and at least one flex portion within a wall of the carrier for providing enhanced compliance to the carrier in response to force directed on the at least one planet gear.

In an aspect, the carrier comprises a first part and a second part and the at least one flex portion comprises a neck portion, a ring portion and a gap between the neck portion and the ring portion and the wall of the carrier In another aspect, each of the at least one flex portions comprises a carrier ring, a carrier stabilizer and a ring gap, the ring gap serving as the at least one planet pin opening.

An embodiment of the invention includes a method for fabricating a planetary gear system. The method includes providing a carrier having at least one planet pin opening, providing a planet pin for accommodation within the at least one planet pin opening, forming at least one flex portion within the carrier, and installing at least one planet gear adjacent to the at least one flex portion.

These and other features, aspects and advantages of the present invention may be further understood and/or illustrated when the following detailed description is considered along with the attached drawings.

DETAILED DESCRIPTION

The present specification provides certain definitions and methods to better define the embodiments and aspects of the invention and to guide those of ordinary skill in the art in the practice of its fabrication. Provision, or lack of the provision, of a definition for a particular term or phrase is not meant to imply any particular importance, or lack thereof; rather, and unless otherwise noted, terms are to be understood according to conventional usage by those of ordinary skill in the relevant art.

Unless defined otherwise, technical and scientific terms used herein have the same meaning as is commonly understood by one of skill in the art to which this invention belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the terms "front", "back", "bottom", and/or "top", unless otherwise noted, are merely used for convenience of description, and are not limited to any one position or spatial orientation. If ranges are disclosed, the endpoints of all ranges directed to the same component or property are inclusive and independently combinable.

The modifier "about" used in connection with a quantity is inclusive of the stated value and has the meaning dictated by the context (e.g., includes the degree of error associated with measurement of the particular quantity). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

Embodiments of the invention are intended to better accommodate pin misalignment relative to the central shaft, to more evenly distribute the force along the planet gear tooth width, and to more evenly share the loading among the various planet gears.

Figure 1:
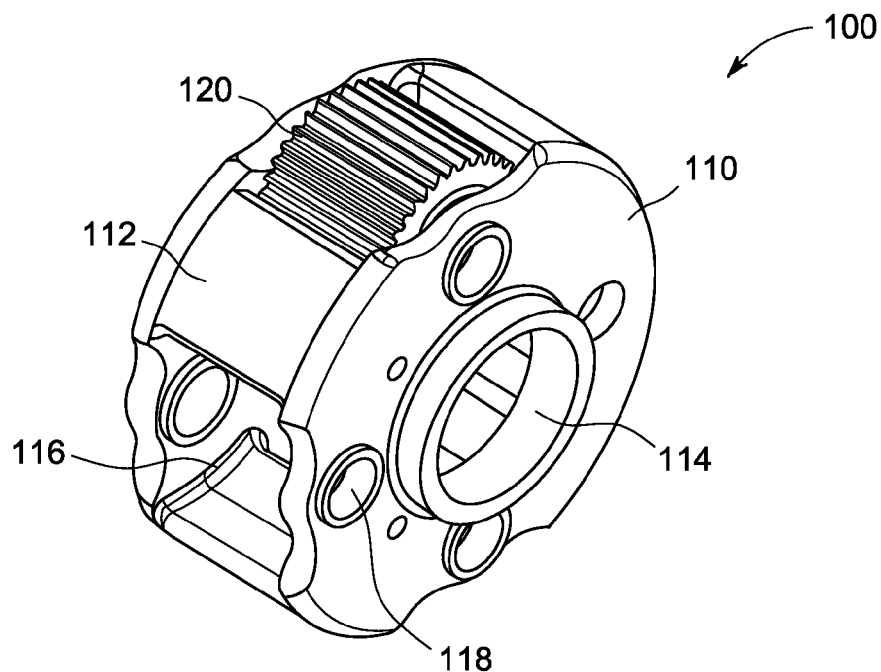
FIG. 1 is a schematic view of a planet gear system.
Figure 2:
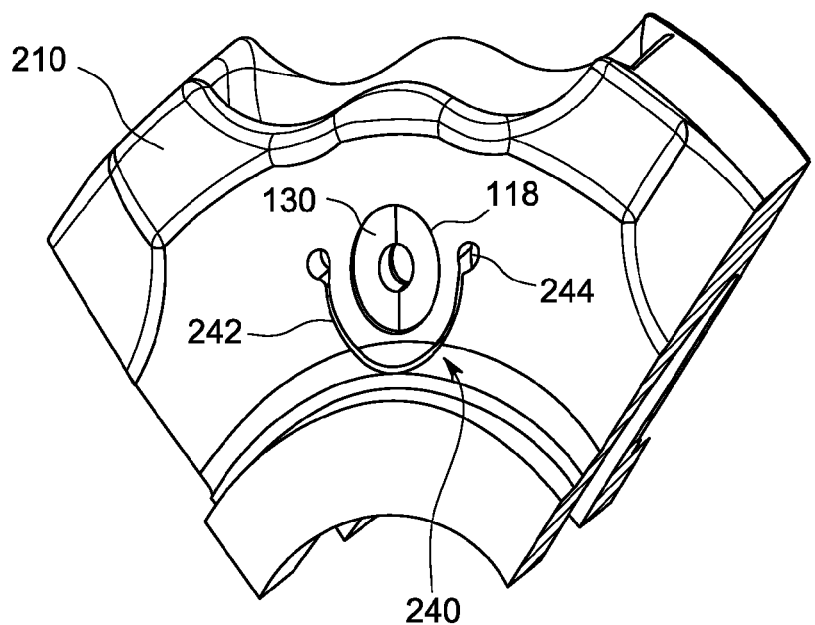
FIG. 2 is a partial schematic view illustrating a carrier in accordance with an embodiment of the invention.

FIG. 1 illustrates a planetary gear system 100 including a carrier 110 and a planet gear 120. The carrier 110 has a carrier body 112 which includes a sun gear opening 114, a plurality of planet gear openings 116, and a plurality of planet pin openings 118. The planet pin openings 118 serve as anchoring points for planet pins, about which each planet gear 120 is disposed. A portion of each planet gear 120 protrudes through a respective planet gear opening 116. Although only a single planet gear 120 is illustrated in FIG. 2, it is to be understood that four such planet gears 120 are intended for mounting on the carrier 110 of FIG. 2. Further, it is to be understood that more or less than four planet gears 120 may be mounted on a carrier, depending upon the need and the configuration of the carrier.

FIG. 2 illustrates a partial carrier 210 according to an embodiment of the invention. The carrier 210 includes a plurality of planetary pin openings 118, one being shown, through which pins, such as pins 130, extend. A substantially concave shaped flex portion 240 outlines a radially inward position of and adjacent to or close to the pin openings 118. The flex portion 240 includes a flex line 242 ending at a pair of flex cavities 244. The flex line 242 does not provide much compliance or flex in response to a radially directed force on a pin 130. The flex cavities 244, on the other hand, do provide flex in response to tangentially directed forces on the pin 130.

It should be appreciated that the flex portion 240 can be sited at different locations around the pin openings 118. For example, the flex line 242 can be sited so that a portion is radially exterior to the pin openings 118. Further, the flex cavities 244 may be sited at other locations along the flex line 242 rather than at its terminus. Also, there may be more than two flex cavities 244 per flex line 242. Finally, it should be appreciated that the flex portion 240 may be sited on both sides of the carrier or only one side and in the general vicinity of all of the pin openings 118 or only a subset of them.

Figure 3:
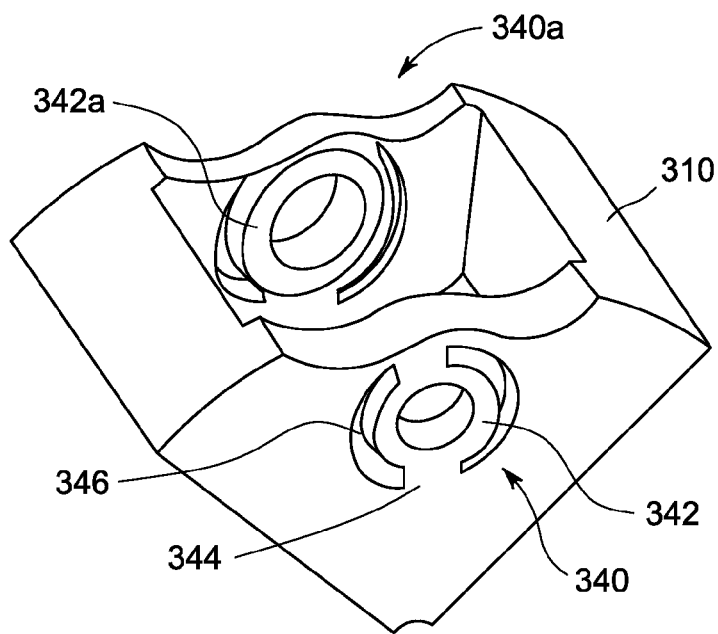
FIG. 3 is a partial schematic view illustrating a carrier in accordance with an embodiment of the invention.

FIG. 3 illustrates a partial carrier 310 according to an embodiment of the invention. As with the previously described carriers, carrier 310 includes openings to receive planet gears. One such opening is shown in FIG. 3. The carrier 310 further includes a plurality of flex portions 340, 340a built into the carrier walls. The flex portion 340 includes a carrier ring 342 and a pair of carrier stabilizers 344. The carrier ring 342 is configured and sized to receive a planet pin, like pin 130. The carrier ring 342 is separated from the rest of the carrier wall by a gap 346, and is formed contiguous with the carrier wall through the pair of radially located stabilizers 344. The opening within the carrier ring 342 serves as a conduit for oil access, as well as an anchoring point for a planet pin. The flex portion 340a is configured and sized to serve as a through hole for a planet pin, such as pin 130. The flex portion 340a has a carrier ring 342a which is larger in size than the carrier ring 342.

While FIG. 3 illustrates a pair of flex portions 340, 340a built within carrier walls, it should be understood that only one of the pair of flex portions may be formed in the carrier walls, with one end of the planet pin fitting into a carrier ring 342 or 342a and the other end into another receiving element. The receiving element may simply be an opening 118, or it may be any of the other flex portions described herein. The carrier 310 is to be made of a material that is stronger to allow for higher stresses at the location of the flex portions 340.

Figure 4:
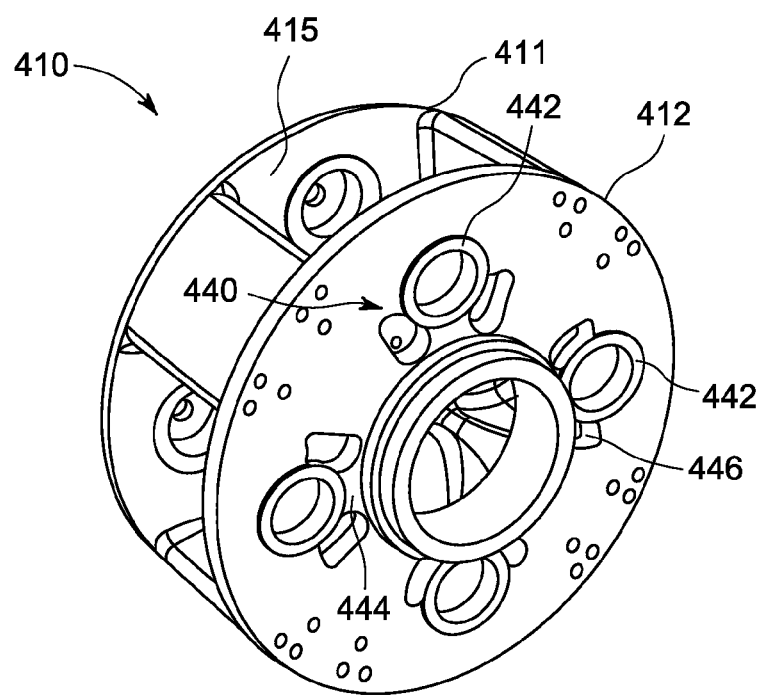
FIG. 4 is a schematic view of a carrier in accordance with an embodiment of the invention.

FIG. 4 illustrates a carrier 410 according to an embodiment of the invention. The carrier 410 includes a first part 411 and an opposing second part 412. The carrier body 411 has a carrier inner surface 415. A cut-out portion is located in the inner surface 415. The cut-out portion is configured to accommodate an insert. U.S. patent application Ser. No. 13/155,417, entitled "GEAR SYSTEM AND METHOD FOR USING SAME", filed Jun. 8, 2011, provides more information on the specifics of the cut-out portions and inserts and is incorporated herein by reference in its entirety.

The carrier first part 411 may be formed of a lower strength material, such as cast iron, while the carrier second part 412 may be formed of a high strength material, such as, high strength steel material. For example, the carrier second part 412 may be formed of a high strength alloy steel that has a yield strength of up to about 690 megapascals (MPa).

Flex portions 440 are formed on one or both of the carrier parts 411, 412. The flex portions 440 each include a ring portion 442, a neck portion 444, and a gap 446. Further, there is a gap between the radially outermost portion of the ring portions 442 and the carrier second part 412 that is very slight. The gap 446 on either side of neck portions 444 is greater in size than the slight gap between the ring portions 442 and the second part 412 of the carrier 410. The positioning of the gaps allows for a flexing of the flex portions 440 in response to a tangentially directed force on the planet pins, but less flexing in response to a radially directed force.

By forming the flex portions 440 only on the carrier second part 412, a lower strength and less compliant and less expensive material can be used to form the carrier first part 411, for example, cast iron. It should be understood, however, that both carrier parts 411, 412 can be formed of a high strength material, and flex portions 440 can be formed in both parts.

Figure 5:
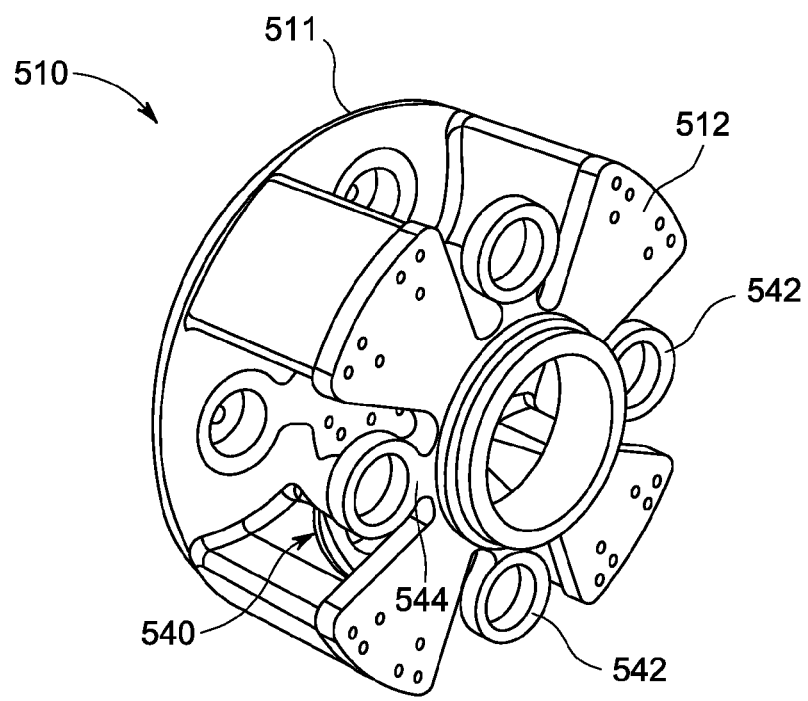
FIG. 5 is a schematic view of a carrier in accordance with an embodiment of the invention.

FIG. 5 illustrates a carrier 510 according to an embodiment of the invention. Like the carrier 410, the carrier 510 includes a first part 511 and an opposing second part 512. Like the embodiment illustrated in FIG. 4, the first part 511 may be formed of less expensive materials, such as cast iron, and include a compliant insert formed of a more compliant material, such as high strength steel. The second part 512 may be formed of a high strength steel material. The second part 512 includes a plurality of flex portions 540, each having a ring portion 542 and a neck portion 544. The flex portions 540 are separated from the remaining portions of the second part 512 by gaps. The positioning of the gaps allows for a flexing of the flex portions 540 in response to a tangentially directed force on the planet pins, but less flexing in response to a radially directed force due to the stiffening quality of the neck portions 544.

While only the second part 512 is shown with formed flex portions 540, it should be understood that both carrier parts 511, 512 can be formed of a high strength material, and flex portions 540 can be formed in both parts.

Figure 6:
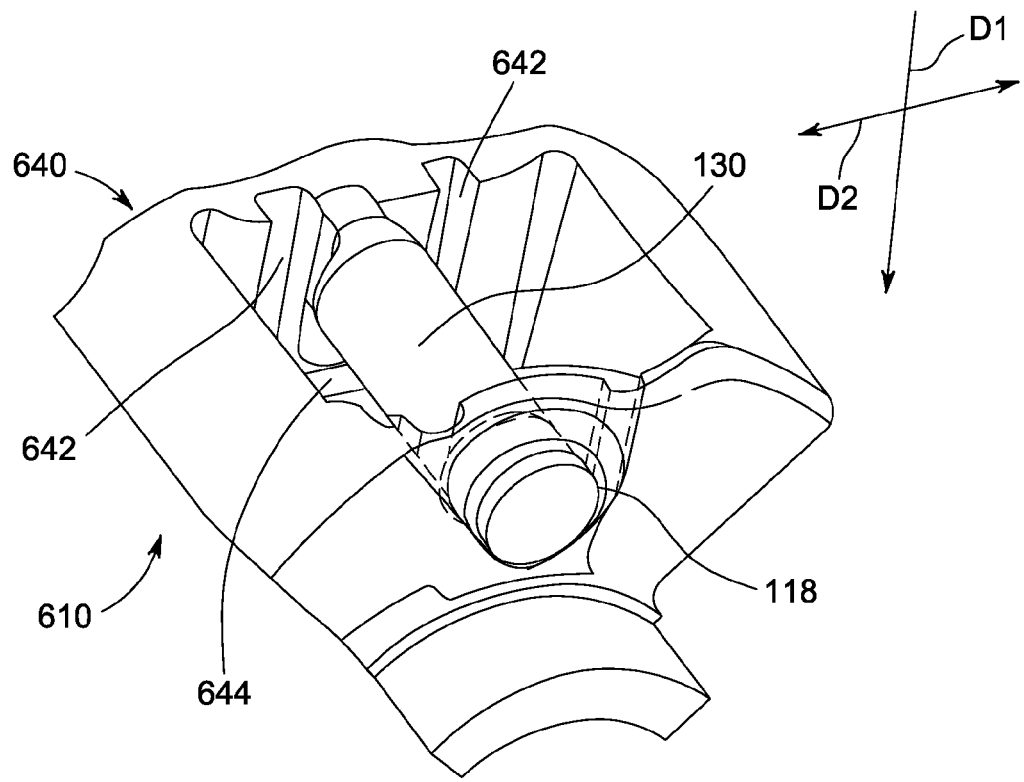
FIG. 6 is a partial schematic view of a carrier in accordance with an embodiment of the invention.

FIG. 6 illustrates a partial carrier 610 in accordance with an embodiment of the invention. The carrier 610 includes a plurality of pin openings 118, one being shown, to each accommodate a planet pin 130. On an internal surface of the carrier 610 adjacent to or in the general vicinity of the pin openings 118 is located a flex portion 640. Specifically, as illustrated, the flex portion 640 is a generally U-shaped area on an interior surface of the carrier 610 in which material has been removed. By removing material from a surface of the carrier 610, the carrier is made more compliant to forces directed on the planet gears.

The flex portion 640 includes a pair of flex channels 642 extending on either side of the pin openings 118. A flex connector 644 positioned radially interior to the pin openings 118 is formed to connect the pair of flex channels 642. The flex connector 644 allows flexure of the flex portions 640 in response to a radially directed force D1 on the planet gears. Further, the flex channels 642 allow flexure of the flex portions 640 in response to a tangentially directed force D2 on the planet gears.

It should be appreciated that the flex portions 640 can be formed on either side of the carrier 610 or only on one side. Also, it should be appreciated that the flex portions 640 may be formed on an exterior surface of the carrier 610 instead of the interior surface as illustrated. It should further be appreciated that the flex connector 644 may not connect with the flex channels 642, but instead may be separated from them some distance.

Figure 7:
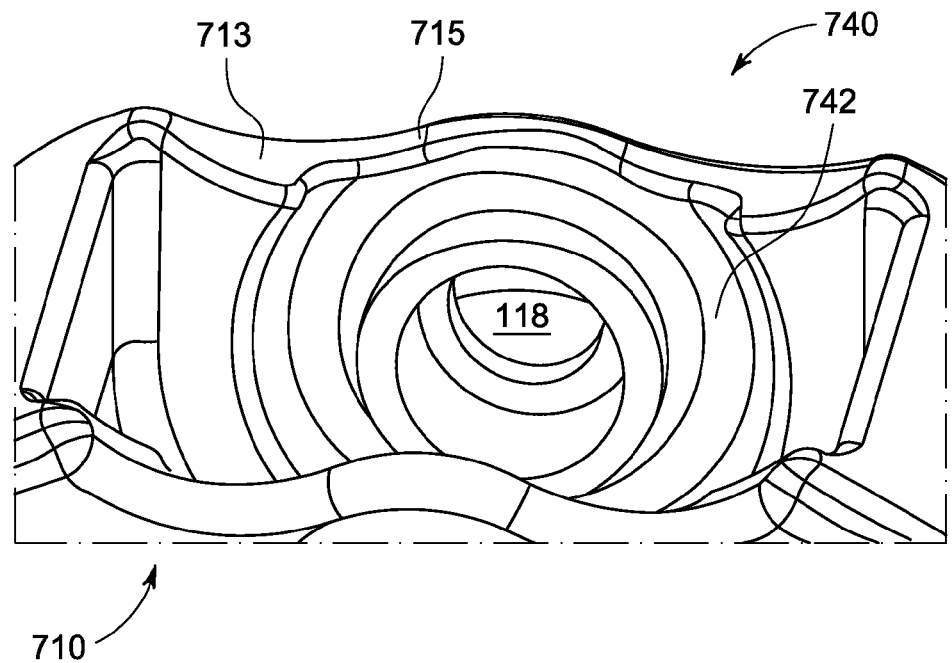
FIG. 7 is a partial schematic view of a carrier in accordance with an embodiment of the invention.

FIG. 7 illustrates a portion of a carrier 710 in accordance with an embodiment of the invention. The carrier 710 includes flex portions 740 formed on an interior surface thereof and adjacent to or in the general vicinity of the pin openings 118. The carrier 710 includes an outer surface 713. The flex portions 740 include a flex indent 742 formed on an interior surface of the carrier 710 and surrounding the pin openings 118. The flex indent 742 extends up to the outer surface 713 of the carrier 710, forming carrier flex surfaces 715. The flex indents 742 and the carrier flex surfaces 715 allow the flex portions 740 to flex in response to tangential or radial forces directed at the planet gears. The flex portions 740 provide a comparable stiffness for the planet pins in all directions.

It should be appreciated that the flex indents 742 can be formed on either side of the carrier 710 or only on one side. Further, it should be appreciated that the flex indents 742 can be formed on an exterior surface of the carrier 710 instead of on an interior surface as illustrated.

Figure 8:
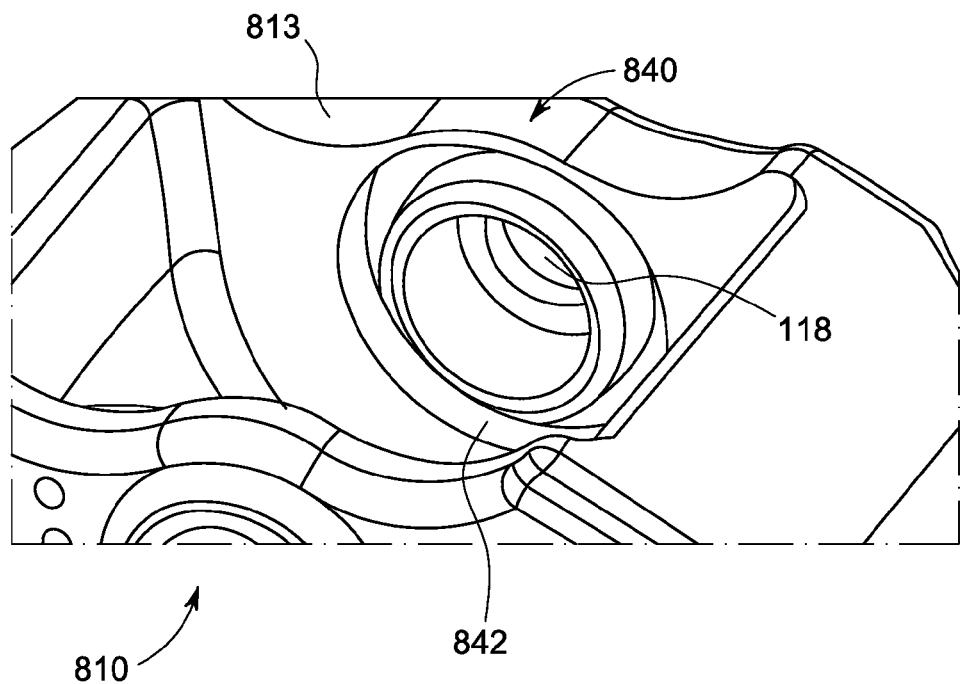
FIG. 8 is a partial schematic view of a carrier in accordance with an embodiment of the invention.

FIG. 8 illustrates a portion of a carrier 810 in accordance with an embodiment of the invention. The carrier 810 includes flex portions 840 formed on an interior surface of the carrier 810 and adjacent to or in the general vicinity of the pin openings 118. The carrier 810 includes an outer surface 813. The flex portions 840 include a flex moat 842 completely surrounding the pin openings 118 on an interior surface of the carrier 810 and radially interior to the outer surface 813. The flex moats 842 allow the flex portions 840 to flex in response to tangential or radial forces directed at the planet gears. The flex moats 842 provide a comparable stiffness for the planet pins in all directions.

It should be appreciated that the flex moats 842 can be formed on either side of the carrier 810 or only on one side. Further, it should be appreciated that the flex moats 842 can be formed on an exterior surface of the carrier 810 instead of on the interior surface as illustrated.

Figure 9:
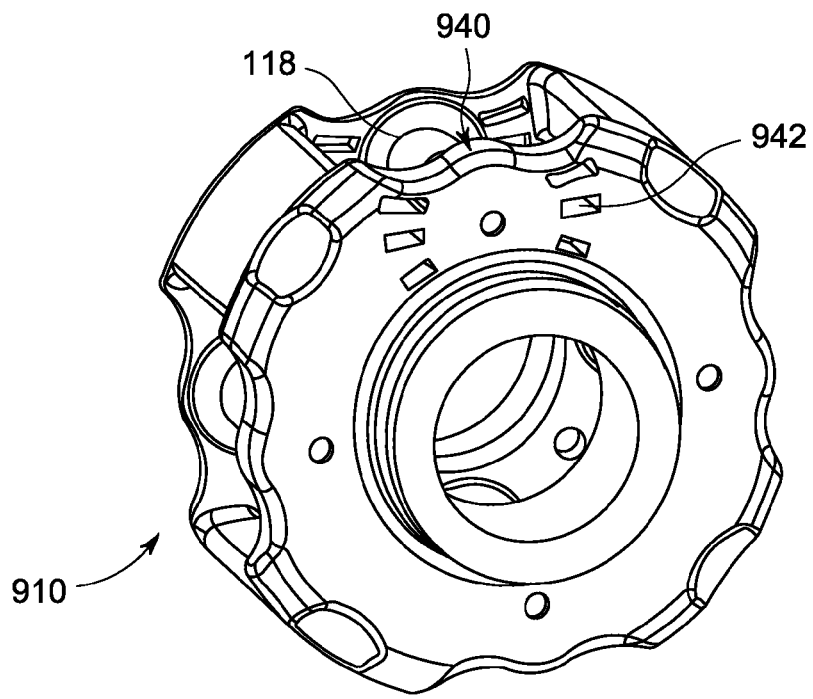
FIG. 9 is a schematic view of a carrier in accordance with an embodiment of the invention.

FIG. 9 illustrates a carrier 910 in accordance with an embodiment of the invention. The carrier 910 includes flex portions 940 formed in the carrier 910 and adjacent to or in the general vicinity of the pin openings 118. The flex portions 940 include a plurality of slits 942 having a greater length than width. The length of the slits 942 extends generally radially outward from the pin openings 118. The slits 942 allow flexure in a tangential direction. In operation, the slits allow tangential compliance by compressing the solid portions within the carrier walls formed by the slits 942. It should be appreciated that the flex portions 940 can be formed on either side of the carrier 910 or only on one side. Although extending the slits 942 all the way through the carrier wall will provide more compliance, it should be appreciated that the slits 942 need not extend completely through the carrier wall.

Figure 10:
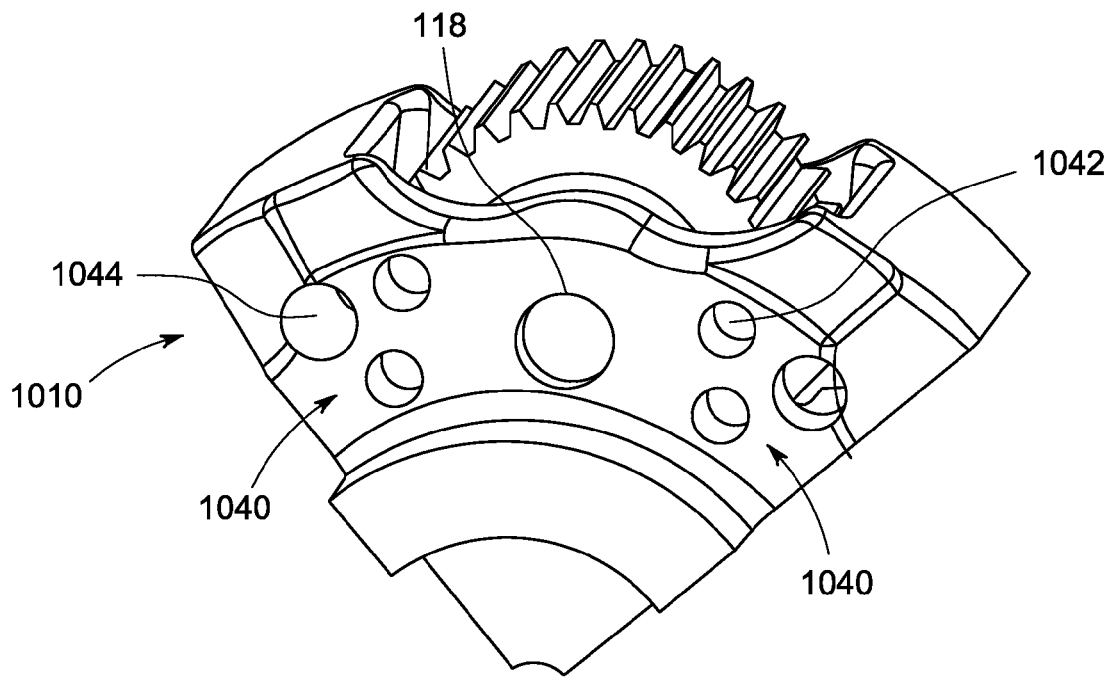
FIG. 10 is a partial schematic view of a carrier in accordance with an embodiment of the invention.

FIG. 10 illustrates a partial carrier 1010 in accordance with an embodiment of the invention. The carrier 1010 includes flex portions 1040 positioned generally tangentially on either side and adjacent to or in the general vicinity of the pin openings 118. The flex portions 1040 include a plurality of inner openings 1042 and outer openings 1044. The inner and outer openings 1042, 1044 are generally circular in shape, with the outer openings 1044 being relatively larger in size than the inner openings 1042. The openings 1042, 1044 allow tangential flexure. It should be appreciated that the flex portions 1040 can be formed on either side of the carrier 1010 or only on one side. It should be further appreciated that flex portions 1040 may be sited on only one side of the pin openings 118 instead of both sides as illustrated. It should also be further appreciated that the inner openings 1042 may instead be of relatively larger size than the outer openings 1044.

Figure 11:
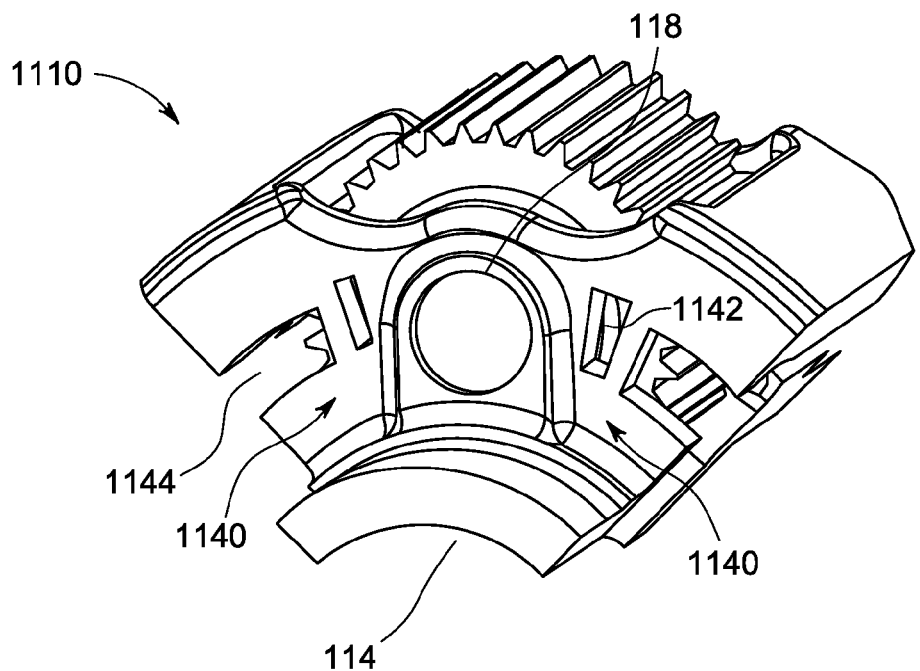
FIG. 11 is a partial schematic view of a carrier in accordance with an embodiment of the invention.

FIG. 11 illustrates a partial carrier 1110 in accordance with an embodiment of the invention. The carrier 1110 includes flex portions 1140 sited adjacent to or in the general vicinity of and on either side of the pin openings 118. The flex portions 1140 include inner windows 1142 and outer windows 1144. The inner windows 1142 each have a length greater than their width, and the lengths extend radially outward from the sun gear opening 114. The outer windows 1144 each have a length greater than their width and their widths extend radially outward from the sun gear opening 114. The windows 1142, 1144 allow tangential flexure. It should be appreciated that the flex portions 1140 can be formed on either side of the carrier 1110 or only on one side. It should be further appreciated that flex portions 1140 may be sited on only one side of the pin openings 118 instead of both sides as illustrated.

Figure 12:
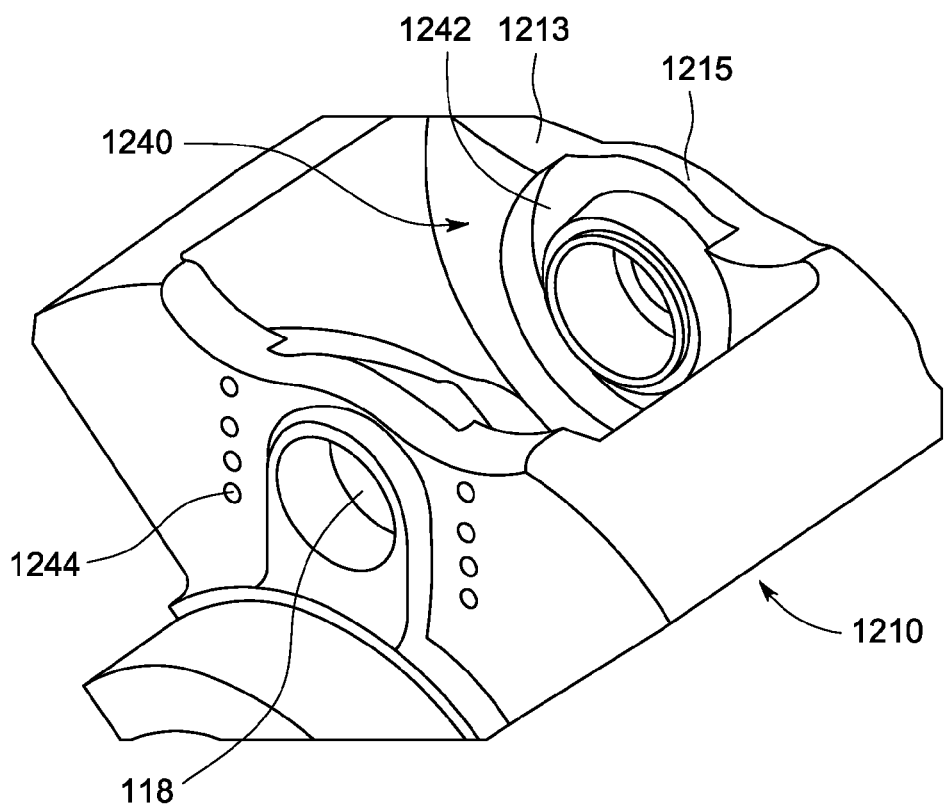
FIG. 12 is a partial schematic view of a carrier in accordance with an embodiment of the invention.

FIG. 12 illustrates a partial carrier 1210 in accordance with an embodiment of the invention. The carrier 1210 includes an outer surface 1213. The flex portions 1240 include flex indents 1242 adjacent to or in the general vicinity of the pin openings 118 and formed on an interior surface of the carrier 1210. The flex portions 1240 also include a plurality of orifices 1244 on either side and adjacent to or in the general vicinity of the pin openings 118. The flex indents 1242 extend around the pin openings 118 and up to the outer surface 1213, forming flex surfaces 1215. The flex indents 1242 and the carrier flex surfaces 1215 allow the flex portions 1240 to flex in response to tangential or radial forces directed at the planet gears. The orifices 1244 allow tangential flexure. It should be appreciated that the flex portions 1240 can be formed on either side of the carrier 1210 or only on one side. It should be further appreciated that the orifices 1244 can be sited on one side of the pin openings 118 instead of both sides as illustrated. Further, the orifices 1244 can be located radially above and below the pin openings 118, either in addition to or in lieu of the illustrated orifices 1244.

Figure 13:
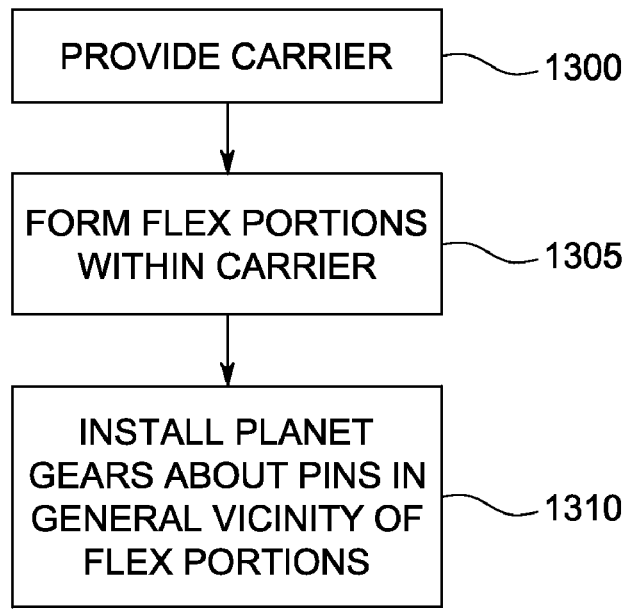
FIG. 13 illustrates a process for forming a planetary gear system with a carrier having flex portions in accordance with an embodiment of the invention.
Figure 14:
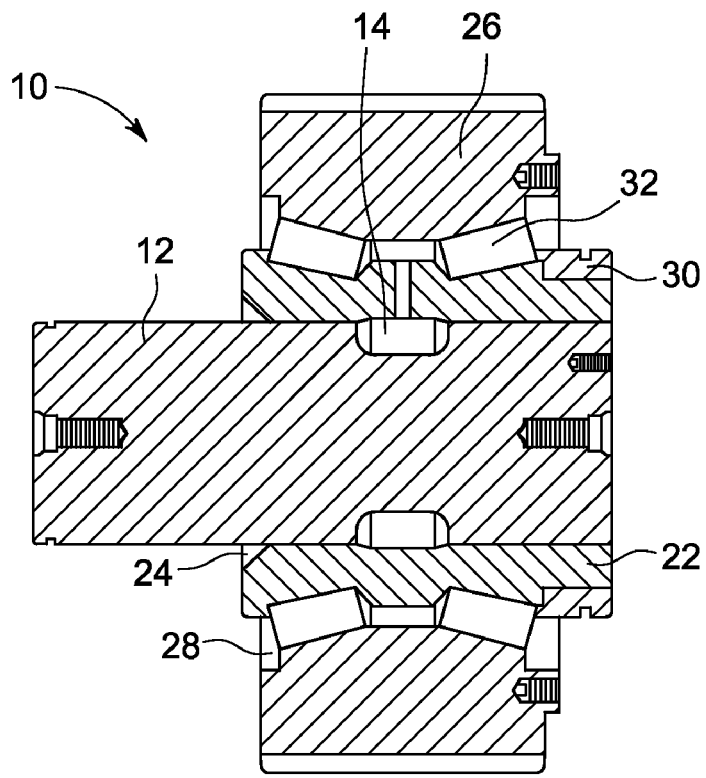
FIG. 14 is a cross-sectional view of a conventional compliant planetary gear system.

With specific reference to FIG. 13, and more general reference to FIGS. 2-12, a method for fabricating a planetary gear system, such as planetary gear system 100, is shown. At Step 1300, a carrier is provided. The carrier may be carriers 210-1210 (FIGS. 2-12). For example, the carrier 410 or the carrier 510 can be provided with carrier first parts 411, 511 and carrier second parts 412, 512. Alternatively, carriers 710 or 810 can be provided.

At Step 1305, a flex portion or a plurality of flex portions are formed within the carrier. The flex portions may be flex portions 240-1240 as illustrated in and described with reference to FIGS. 2-12. For example, flex portions 440 may be formed in either or both of carrier 410 first and second parts 411, 412. Or, flex portions 540 may be formed in either or both of carrier 510 first and second parts 511, 512. Alternatively, flex portions 740 or 840 can be formed in, respectively, carriers 710 or 810.

Next, at Step 1310, planet gears, such as planet gear 120, is installed within the openings of the carrier. Specifically, each planet gear 120 is positioned within a carrier opening and a planet pin 130 is fitted within a pin opening 118. The flex portions sited within the general vicinity of the pin openings 118 provide enhanced compliance to the carrier by allowing flexure in response to force directed on the planet gears.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For example, while embodiments have been described in terms that may initially connote singularity, it should be appreciated that multiple components may be utilized. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A planetary gear system, comprising:
   at least one planet gear;
   at least one planet pin receiving the at least one planet gear; and
   a carrier, comprising:
      at least one carrier opening for accommodating the at least one planet gear;
      at least one planet pin opening for receiving the at least one planet pin; and
      at least one flex portion within a wall of the carrier for providing enhanced compliance to the carrier in response to force directed on the at least one planet gear.

2. The planetary gear system of claim 1, wherein the carrier comprises a first part and a second part and the at least one flex portion comprises a neck portion, a ring portion and a gap between the neck portion and the ring portion and the wall of the carrier.

3. The planetary gear system of claim 1, wherein each of the at least one flex portions comprises a carrier ring, a carrier stabilizer and a ring gap, the ring gap serving as the at least one planet pin opening.

4. The planetary gear system of claim 1, wherein the at least one flex portion is sited adjacent to the at least one planet pin opening.

5. The planetary gear system of claim 4, wherein each of the at least one flex portions comprises a flex line and at least one flex cavity.

6. The planetary gear system of claim 4, wherein each of the at least one flex portions comprises a pair of flex channels and a flex connector formed in the carrier wall.

7. The planetary gear system of claim 6, wherein the flex connector connects with each of the pair of flex channels.

8. The planetary gear system of claim 4, wherein each of the at least one flex portions comprises a flex indent and a carrier flex surface.

9. The planetary gear system of claim 4, wherein each of the at least one flex portions comprises a flex moat.

10. The planetary gear system of claim 4, wherein each of the at least one flex portions comprises a plurality of flex slits.

11. The planetary gear system of claim 4, wherein each of the at least one flex portions comprises at least one inner opening and at least one outer opening.

12. The planetary gear system of claim 4, wherein each of the at least one flex portions comprises at least one inner window and at least one outer window.

13. The planetary gear system of claim 4, wherein each of the at least one flex portions comprises:
   a carrier flex surface;
   a flex indent; and
   a plurality of orifices within the carrier wall.

14. A method of fabricating a planetary gear system, comprising:
   providing a carrier having at least one planet pin opening;
   providing a planet pin for accommodation within the at least one planet pin opening;
   forming at least one flex portion within the carrier; and
   installing at least one planet gear adjacent to the at least one flex portion.

15. The method of claim 14, wherein the providing a carrier comprises providing a carrier having a first part and a second part and wherein the forming at least one flex portion comprises forming at least one flex portion in one or both of the first and second parts.

16. The method of claim 14, wherein the forming at least one flex portion comprises removing some material from a wall of the carrier adjacent the at least one planet pin opening.

17. The method of claim 16, wherein the removing some material forms a flex line and at least one flex cavity; a carrier ring, carrier stabilizer, and at least one ring gap; a pair of flex channels and a flex connector; a carrier flex surface and a flex indent; or, a flex moat.

18. The method of claim 16, wherein the removing some material forms a plurality of flex slits; at least one inner opening and at least one outer opening; at least one inner window and at least one outer window; or, a carrier flex surface, a flex indent, and a plurality of orifices.

* * * * *